United States Patent [19]

Gottlieb

[11] 4,105,460

[45] Aug. 8, 1978

[54] PROCESS FOR THE ENDOTHERMIC CALCINATION OF RAW MATERIAL

[76] Inventor: Steven Gottlieb, No. 9 "Karoola", 442-446 Edgecliff Rd., Edgecliff, New South Wales 2027, Australia

[21] Appl. No.: 760,289

[22] Filed: Jan. 19, 1977

[51] Int. Cl.$^2$ .............................................. C04B 7/02
[52] U.S. Cl. .................................... 106/100; 106/103
[58] Field of Search ................................ 106/100, 103

[56] References Cited

U.S. PATENT DOCUMENTS

| | | | |
|---|---|---|---|
| 2,769,719 | 11/1956 | De Vaney | 106/100 |
| 2,792,312 | 5/1957 | Geary et al. | 106/100 |
| 2,969,227 | 1/1961 | Ludwig | 106/100 |
| 3,584,850 | 6/1971 | Brandvold et al. | 106/100 |

*Primary Examiner*—J. Poer

*Attorney, Agent, or Firm*—Baldwin, Egan, Walling & Fetzer

[57] ABSTRACT

Endothermic calcination of raw material is effected at a temperature lower than that required for sintering or a chemical reaction, and whereby the calcination is performed in a rotary kiln in which the raw material is in the form of a slurry consisting initially of raw mix and water, the water being partially removed to form a sludge cake which is pelletized and fed downwards through a vertical calciner in the form of a bed consisting of packed pellets, and heat from an axially arranged burner is supplied in a downward stream through the calciner, and the flue gases of the rotary kiln are fed to the calciner to form an upwards directed countercurrent gas flow turbulently passing at a high velocity through the interstices between the packed pellets.

7 Claims, 3 Drawing Figures

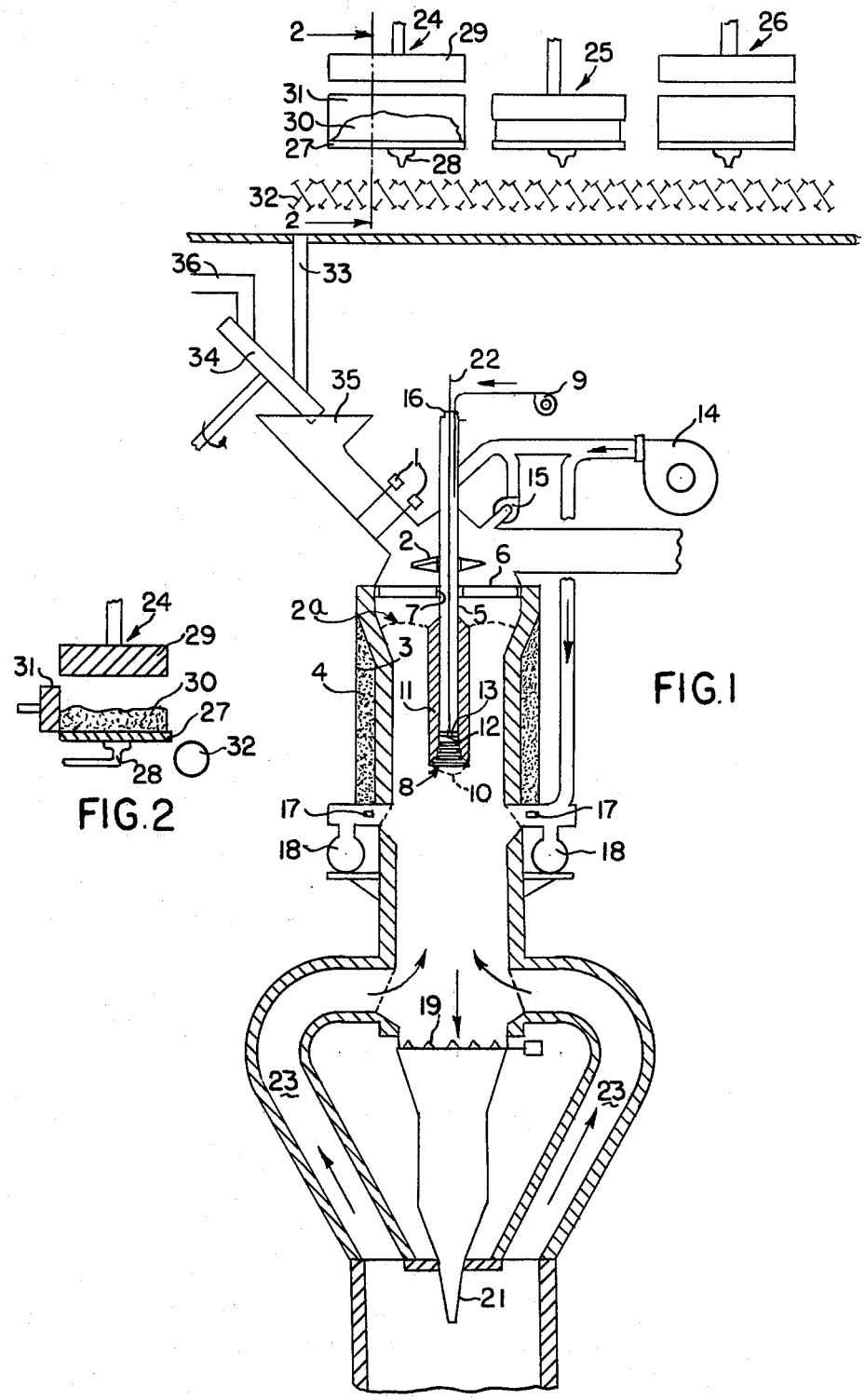

PROCESS FOR THE ENDOTHERMIC CALCINATION OF RAW MATERIAL

This invention relates to a process for the endothermic calcination of raw material, in which the endothermic calcination is effected at a temperature lower than that required for a sintering step or a chemical reaction performed in a following rotary kiln, and in which the raw material is pelletized and fed downwards through a vertical calciner in the form of a bed consisting of packed pellets, and heat from an axially arranged burner is supplied in a downward stream through the calciner, and the flue gases of the rotary kiln are fed to the calciner to form an upwards directed countercurrent gas flow turbulently passing at a high velocity through the interstices between the packed pellets.

Such a process, which permits calcination, i.e., the conversion of $CaCO_3$ into $CaO$, with low heat consumption, forms the subject-matter of the German Patent Application P 24 41 710.5. In this process, the heat content of the hot flue gases from the rotary kiln is utilized for producing a countercurrent flow in the calciner, together with feeding oxygen required for combustion in the calciner.

In the process described in the above-specified German Patent Application the raw material is used in pelletized form, the pellets being formed by means of a rotary pelletizing pan as described in the Australian Patent Specification 152,109, which pan is arranged above the vertical calciner and which converts correspondingly prepared raw material mix into pellets.

There are "dry" and "wet" cement plants. In the first-mentioned case, the rotary kiln is charged with powdered raw mix, while in the second-mentioned case the kiln is charged with a slurry formed from powdered raw mix. Other known cement burning plants operating with a cyclone system having a flash furnace or a fluid bed and arranged before the rotary kiln, thus permitting at least partial precalcination of the material charged into the kiln, must be designed as dry plants, i.e., they require the feeding of powdered raw mix to the cyclone system.

The process described in said German Patent Application permits the conversion of an already existing cement plant having a rotary kiln performing both the calcination and also the subsequent sintering to form cement clinkers, to higher capacity without having to multiply or increase the existing plant. The arrangement of the precalciner according to the German Patent Application results in that the rotary kiln will be utilized only for supplying the relatively small amount of heat required for increasing the temperature of the precalcined raw material, while the greater part of the calcination itself is economically performed in the calciner. About 100 kcal per kg clinker are supplied to the raw mix in the rotary kiln; in this connection it is pointed out that the sintering process is exothermic.

Although the already mentioned wet process has the advantages of better anti-pollution effects and easier homogenization of the ground raw mix, it also has the disadvantage of considerably greater fuel consumption. In the wet process, it is impossible to provide a preceding cyclone system including a flash furnace or a fluid bed, because, as already mentioned, the provision of such a cyclone system requires feeding of powdered raw mix.

It is an object of the present invention to provide a process for the endothermic calcination of raw material, in which the units of a wet cement burning plant may to a large extent be used but in which the disadvantage of excessive fuel consumption inherent in the wet process is eliminated.

With the process of the specified type this object is solved according to the invention in that from the raw material slurry consisting of raw mix and water, the water is partially removed and the thus formed sludge cake is pelletized for being subsequently fed to the vertical calciner.

With the process according to the invention it is possible to convert an existing wet cement plant with relatively little expenditure in such a manner that a considerably improved heat economy, connected with an enhanced capacity of the rotary kiln, i.e., a substantially lower fuel consumption, is achieved, while the advantages of the wet process, viz., better anti-pollution effects and easier homogenization of the ground raw material, are retained.

An embodiment of the invention will be described with reference to the accompanying drawing, in which FIG. 1 is a partial sectional view of an arrangement suitable for performing the process according to the invention;

FIG. 2 is a sectional view taken along line II—II in FIG. 1; and

Figure 3:
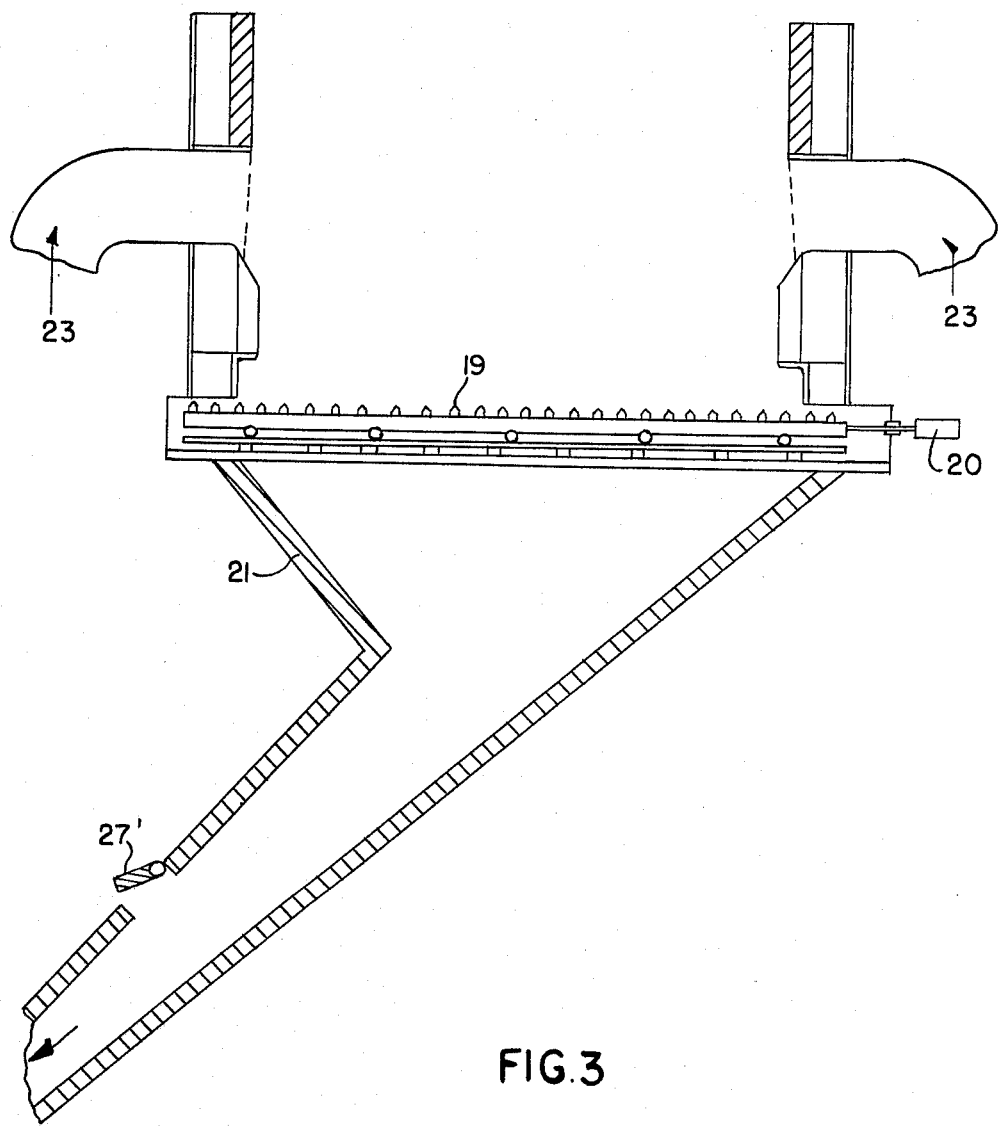
FIG. 3 is an enlarged view of a modified embodiment of a part of the calciner shown in FIG. 1.

In the arrangement shown in FIG. 1 the pellets are fed through hydraulically operated alternating gates 1 into a pellet distributor 2, which distributes the pellets evenly and maintains a constant pellet level 2a in the calciner. Instead of the disc-shaped distributor 2 shown in FIG. 1 a rotating feed chute may be used. The calciner shell 3 is provided with a heat insulation 4. An iron pipe 5 is held by a steel structure 6 and is adjustable by a sleeve 7. At its lower end the pipe is welded to steel pipes 8, which form a bell-shaped structure in which water is circulated by a pump 9 at a pressure of 5 atm. The bell-shaped structure, in conjunction with the natural angle of repose 10 of the pellets, forms a combustion space and also supports a refractory lining 11 protecting the iron pipe 5. A gas or oil burner nozzle 12 is disposed in the centre of the neck of the bell-shaped structure and is held in position by a ring 13. Gas or atomized oil 22 and air are blown into the calciner downwards into the pellet bed by an air fan 14. The produced flame temperature may be adjusted by a small regulable quantity of flue gas drawn out of the main gas stream by means of a fan 15. A window 16 serves for observation of the flame formed in the pellet bed.

Side burners 17 supply heat to the calciner from outside and are supplied with air through a duct 18 by the fan 14.

A discharge grate 19 carrying the pellets packed in the calciner is hydraulically driven, and the calcined pellets are fed through the discharge grate 19 into a refractory feed chute 21 and thence into a rotary kiln (not shown) provided downstream thereof.

Flue gases from the rotary kiln with a temperature between 200° C and 1000° C are supplied to the calciner through two firebrick lined ducts 23 above the discharge grate 19 and flow upward in the calciner and, in conjunction with the heat supply in the centre of the bed and at the periphery thereof, effect an extension of the time period during which the pellets are kept at a temperature above calcination temperature. If low temperatures of the rotary kiln flue gases are concerned, as is the case with long rotary kilns, the desired degree of calcination can be obtained by supplying more fuel through 12 and 17. An electrical interlock between the temperature of the exit cooling water and the discharge rate of the discharge grate 19 permits the temperature and timing conditions in the calciner to be maintained constant. The interstices between the packed pellets form a relatively small flow cross-section for the countercurrent gas flow, which therefore flows turbulently through the pellet bed at a high velocity and thus ensures excellent heat transfer. To perform calcination, relatively little heat is therefore required in addition to that supplied by the rotary kiln. The heat transfer in the preheating zone of the calciner also is very efficient and effects evaporation of water from the pellets and also a low exit flue gas temperature.

In accordance with the invention the pellets fed to the gates 1 are made up of raw material slurry consisting of raw mix and water. In the usual wet process the raw material slurry is fed directly to a long rotary kiln for the manufacture of cement clinkers, so that a large quantity of heat is required for evaporating the water contained in the slurry. In the present process the raw material slurry is fed by conveyor means (not shown) to a water removing means disposed above the calciner and consisting of at least three identical water removing units 24, 25, and 26, of which only unit 24 will be described in detail. The water removing unit 24 includes a suction pad 27 to the underside of which a negative pressure may be applied by a vacuum duct 28. Above the suction pad 27 there is provided a reciprocating pressure plunger 29, through which pressure may be applied to a layer 30 of raw material slurry placed on the suction pad.

Laterally adjacent the suction pad 27 there is disposed a clearing plunger 31 movable transversely across the suction pad 27 such that a sludge cake formed by partial desiccation of raw material slurry on the suction pad 27 may be cleared therefrom.

On the side of the suction pad 27 opposite to the clearing plunger 31 there is provided a double mixing screw conveyor 32 which, as shown in the FIGS. 1 and 2, extends along the three water removing units 24, 25, and 26. The screw conveyor 32 serves to receive the sludge cake, to homogenize the same and feed it to a vertical pipe 33 through which the sludge cake is fed to a pelletizer 34, which may for instance be the pelletizer described in the Australian Patent Specification 152,109. The lower rim of the rotating inclined pelletizer pan is positioned in the receiving range of a chute 35, which feeds the pellets discharged from the pan to the gates 1.

In operation, a predetermined quantity of raw material slurry 30 is placed on the suction pad 27 and water is partially removed therefrom by the combined action of the pressure plunger 29 and the negative pressure applied to the pad until a slightly moist sludge cake is obtained. When the pressure plunger 29 has been lifted, the sludge cake is cleared from the suction pad 27 by the clearing plunger 31 and is fed to the screw conveyor 32. Preferably, an overpressure is temporarily applied to the vacuum duct 28 to promote clearing. From the screw conveyor 32 the sludge cake is fed through the vertical pipe 33 to the pelletizer 34, in which pellets are formed. The usual admixing of water to the pelletizer may be omitted provided the desiccation of the raw material slurry has been performed up to a moisture degree of the sludge cake suitable for pelletization. Preferably, a small amount of dust is fed from the electrostatic precipitator through a chute 36 to the pelletizer 34 in order to strengthen the surfaces of the pellets.

The three water removing units 24, 25, and 26 operate in a similar manner and in parallel; however, as schematically indicated in FIG. 1, the steps of charging the raw material slurry, the combined sucking-off and pressing, and the clearing of the sludge cake in each unit are performed with a time shift relative to the corresponding steps in the other units. The dimensions of the water removing units 24, 25 and 26 and the course of the operating cycles thereof are suitably selected such that the desired consistence of the sludge cake supplied through the pipe 33 into the lower part of the pelletizer 34 is obtained.

Preferably, coal dust is added to the raw material by supplying the same at a well-defined rate to the screw conveyor 32. In that case, oil or gas fuel is used only for the start-up of the calciner, and upon having reached the desired temperature it is turned over to coal-containing pellets, and upon their arrival in the calcination zone the supply of oil or gas fuel is stopped, only air being supplied through the downwards directed pipe 5 and the side burners 17. The heat economy is improved by such coal firing, as the specific air consumption of coal is much lower than that of oil or gas. As the supplied coal dust has the tendency of stiffening the consistence of the moist sludge cake the dimensions and the course of action of the water removing units must be correspondingly adapted.

The relatively low fuel consumption for the precalcined material in the rotary kiln considerably increases the excess of air obtained at the clinker cooler. This hot air can be used for partially pre-drying the slurry, in which case the water removing units may be smaller and cheaper. The hot air may also be used as primary air supplied through 5 and 18. The man skilled in the art will readily be able to establish suitable values for the specified parameters and for the phase difference between the water removing units 24, 25, and 26.

The arrangement described above may be used with particular advantage for converting an already existing wet cement plant. Thereby the already listed advantages inherent in the wet process may be retained, while the disadvantages of the wet process, like excessive fuel consumption and limited efficiency, are eliminated.

FIG. 3 shows a modified embodiment of the chute 21 leading to the rotary kiln (not shown). While the major quantity of the hot flue gases from the rotary kiln is drawn through the lateral pipes 23 into the calciner, a small portion of the hot flue gases enters in countercurrent flow to the pellets through the chute 21 into the calciner from the bottom thereof.

The temperature of the hot gases supplied to the calciner through the feed chute 21 may be regulated by a flap 27' provided at the chute supply pipe, through which flap a suitable quantity of cold air may be introduced into the flue gas stream. The use of this flap 27' effects considerable cooling of the discharge grate 19 and allows the introduction of air for combustion of the gasified fuel introduced from above. It is thereby possible to reduce the primary air to such an extent that initially, combustion of only a correspondingly small portion of the fuel will occur, whereby the temperature in the calciner is sufficiently increased to gasify the remaining fuel. Combustion of the thus gasified portion of the fuel will then occur by means of the air introduced through the flap 27'. Though the air is reduced by the kiln flue gases, the combustion is promoted by the hot surface of the pellets in the calciner.

What is claimed is:

1. A process for the endothermic calcination of raw material, which is performed at a temperature lower than that required for a sintering step or a chemical reaction performed in a following rotary kiln, comprising the steps of pelletizing the raw material, feeding the thus formed pellets downward through a vertical calciner in the form of a bed consisting of packed pellets, supplying heat from an axially disposed burner through the calciner in a downward stream, supplying the flue gases of the rotary kiln to the calciner for forming an upwards directed countercurrent flow turbulently passing at a high velocity through the interstices between the closely packed pellets, and introducing air through a discharge grate provided at the lower end of the calciner by means of a flap provided at a duct leading to the rotary kiln such that a substantial portion of the fuel injected into the calciner will initially be gasified within the calciner and will then be brought to combustion by means of said air.

2. A process as claimed in claim 1, in which raw material slurry consisting of powdered raw material mixed with water is partially desiccated and the thus formed sludge cake is pelletized for subsequent feeding to the vertical calciner.

3. A process as claimed in claim 2, in which the partial desiccation is performed in such a manner that a layer of raw material slurry is formed and said layer is subjected to a combined suction and pressing operation.

4. A process as claimed in claim 3, in which the partial desiccation occurs in at least three working sections disposed in parallel side-by-side relationship in such a manner that the formation of the layer of raw material slurry, the combined suction and pressing step, and the clearing of the sludge cake, are performed in each working section with a phase-shift relative to the steps performed in the other working sections, and in which the sludge cake produced in each working section is fed to a common outlet such that a substantially continuous production of sludge cake is obtained.

5. A process as claimed in claim 2, in which coal dust or coal slurry is admixed to the raw material.

6. A process as claimed in claim 2, in which dust is fed to the pelletizer for strengthening the surfaces of the pellets.

7. A process as claimed in claim 2, in which excess hot air from a klinker cooler is used for predrying the raw material slurry.

* * * * *